United States Patent
Kugimiya et al.

(10) Patent No.: US 9,458,769 B2
(45) Date of Patent: Oct. 4, 2016

(54) COMBUSTOR SEAL STRUCTURE AND A COMBUSTOR SEAL

(71) Applicant: MITSUBISHI HEAVY INDUSTRIES, LTD., Tokyo (JP)

(72) Inventors: Wataru Kugimiya, Tokyo (JP); Hiroaki Kishida, Tokyo (JP); Kiyoshi Fujimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 144 days.

(21) Appl. No.: 14/177,266

(22) Filed: Feb. 11, 2014

(65) Prior Publication Data
US 2014/0225334 A1 Aug. 14, 2014

(30) Foreign Application Priority Data
Feb. 13, 2013 (JP) .................... 2013-025833

(51) Int. Cl.
| F01D 9/02 | (2006.01) |
| F01D 11/00 | (2006.01) |
| F16J 15/08 | (2006.01) |
| F16J 15/06 | (2006.01) |
| F02C 7/28 | (2006.01) |

(52) U.S. Cl.
CPC .............. F02C 7/28 (2013.01); F01D 9/023 (2013.01); F01D 11/005 (2013.01); F16J 15/061 (2013.01); F16J 15/0887 (2013.01)

(58) Field of Classification Search
CPC ....... F01D 11/005; F01D 9/023; F16J 15/02; F16J 15/0812; F16J 15/0887; F16J 15/122; F16J 15/61; F05D 2240/11; F05D 2240/55; F02C 7/28
See application file for complete search history.

(56) References Cited

U.S. PATENT DOCUMENTS

| 4,897,021 | A * | 1/1990 | Chaplin | F01D 5/22 267/160 |
| 5,125,796 | A * | 6/1992 | Cromer | F01D 9/023 277/637 |
| 6,547,257 | B2 | 4/2003 | Cromer | |
| 7,594,401 | B1 | 9/2009 | Chen et al. | |
| 8,434,999 | B2 | 5/2013 | Amaral et al. | |
| 8,714,565 | B1 * | 5/2014 | Cornett | F01D 11/005 277/644 |
| 8,899,914 | B2 * | 12/2014 | Ring | F01D 5/303 415/119 |
| 8,920,112 | B2 * | 12/2014 | Ring | F01D 25/04 415/119 |
| 2004/0051254 | A1 * | 3/2004 | Smed | F01D 11/005 277/628 |
| 2005/0057003 | A1 * | 3/2005 | Iguchi | F16J 15/0887 277/591 |
| 2005/0082768 | A1 * | 4/2005 | Iguchi | F01D 11/005 277/591 |
| 2007/0212214 | A1 * | 9/2007 | Paauwe | F01D 9/041 415/170.1 |
| 2009/0072497 | A1 * | 3/2009 | Kunitake | F01D 9/023 277/641 |
| 2009/0085305 | A1 * | 4/2009 | Demiroglu | F16J 15/0887 277/637 |
| 2010/0247005 | A1 * | 9/2010 | Aschenbruck | F01D 9/023 384/15 |
| 2011/0140370 | A1 * | 6/2011 | Sutcu | F01D 11/005 277/603 |
| 2012/0292861 | A1 * | 11/2012 | Moehrle | F01D 9/023 277/641 |
| 2012/0292862 | A1 * | 11/2012 | Moehrle | F01D 11/003 277/654 |
| 2013/0177401 | A1 * | 7/2013 | Ring | F01D 25/04 415/119 |
| 2014/0023489 | A1 * | 1/2014 | Fujimoto | F16J 15/0887 415/170.1 |
| 2014/0062032 | A1 * | 3/2014 | Wolfe | F16J 15/128 277/590 |

* cited by examiner

FOREIGN PATENT DOCUMENTS

JP 2010-265905 A 11/2010

Primary Examiner — Kristina Fulton
Assistant Examiner — Nicholas L Foster
(74) Attorney, Agent, or Firm — Westerman, Hattori, Daniels & Adrian, LLP

(57) ABSTRACT

A combustor seal structure includes a first recess portion and a second recess portion that are provided on opposing faces in adjacent flange portions of a transition piece; a seal member body disposed across the first recess portion and the second recess portion; a first projection portion and a second projection portion 64 that are provided at each end portion in the width direction of the seal member body and are capable of being in contact with a first seal face of the first recess portion and a second seal face of the second recess portion; a first spring member whose base end portion is connected to one end portion in the width direction of the seal member body and whose distal end portion extends to the other end portion and is capable of being in contact with a second pressing face.

6 Claims, 6 Drawing Sheets

COMBUSTOR SEAL STRUCTURE AND A COMBUSTOR SEAL

FIELD

The present invention relates to, in a gas turbine that obtains rotative power by feeding fuel to compressed high temperature and pressure air to cause combustion, and feeding generated combustion gas to a turbine, a combustor seal structure and a combustor seal in this gas turbine.

BACKGROUND

A gas turbine includes a compressor, combustors, and a turbine. Air taken in from an air intake is compressed by the compressor to become compressed high temperature and pressure air. In the combustor, fuel is fed to the compressed air to cause combustion, and the high temperature and pressure combustion gas drives the turbine, whereby an electric generator connected to the turbine is driven. In this case, the turbine includes plural turbine vanes and turbine blades that are alternately provided in a casing, and an output shaft connected to the electric generator is rotationally driven by driving the moving blades with the combustion gas. In addition, the combustion gas, which has driven the turbine, is converted to have static pressure by a diffuser in an exhaust casing before it is emitted to atmosphere.

The combustors are circumferentially disposed. As described above, the high temperature and pressure combustion gas is generated by feeding the compressed air with the fuel to cause combustion, and is sent to the turbine. At this time, the combustion gas is introduced from transition pieces into the turbine blades and the turbine vanes of the turbine through a turbine nozzle portion. Thus, also the transition pieces are circumferentially disposed. A combustion gas outlet end in each transition piece and the turbine nozzle portion are connected by a flange portion. A circumference of the flange portion is a compressed air passage. Accordingly, a seal member is provided between adjacent flange portions so that the compressed air cannot penetrate a combustion gas passage.

As such a combustor seal structure, for example, the seal structure described in Patent Literature 1. In the combustor seal structure described in Patent Literature 1, along opposing faces of adjacent flanges at transition piece outlet ends, a recess groove across the opposing faces of the flanges is provided, and a seal assembly formed of a seal member and a plate spring is inserted in the recess groove. A pair of consecutive projection portions in the seal member is disposed across the opposing faces of the flanges, toward a combustion gas passage in the recess groove, and is pressed by the plate spring to form a seal face.

CITATION LIST

Patent Literature

Patent Literature 1: Japanese Patent Application Laid-open No. 2010-265905

SUMMARY

Technical Problem

A seal assembly in the above-described combustor seal structure of the related art is such that a plate spring is combined with a seal member, and has a problem in that its complicated structure increases a production cost. In addition, it is difficult for the seal assembly to maintain stable pressing force along a longitudinal direction. Accordingly, improvement in seal performance is demanded.

The present invention is intended to solve the above-described problem, and its object is to provide a combustor seal structure and a combustor seal that achieve simplification in structure and improvement in seal performance.

Solution to Problem

According to an aspect of the present invention, a combustor seal structure for sealing connection portions between transition piece outlet ends and turbine inlet nozzles of a plurality of combustors disposed in a circumferential direction includes: a first recess portion and a second recess portion that are respectively provided on facing faces of adjacent flange portions at the transition piece outlet ends; a seal member body disposed across the first recess portion and the second recess portion; a first projection portion and a second projection portion, provided at each end portion in a width direction of the seal member body, and capable of being in contact with a first seal face of the first recess portion and a second seal face of the second recess portion; a first spring member having a base end portion connected to one end portion in the width direction of the seal member body and a distal end portion extending to the other end portion, and capable of being in contact with a second pressing face of the second recess portion which faces the second seal face; and a second spring member having a base end portion connected to the other end portion in the width direction of the seal member body and a distal end extending to the one end portion, and capable of being in contact with a first pressing face of the first recess portion which faces the first seal face.

Accordingly, the seal member body is disposed across the first recess portion and the second recess portion. The first projection portion is pressed against the first seal face of a first recess portion by the urging force of the first spring member, the second projection portion is pressed against the second seal face by the urging force of the second spring member; and sealing is performed at a contact position between each projection portion and each seal face, whereby mixing of the compressed air and the combustion gas is prevented. Since in the seal member the projection portion and the spring member are provided on both sides of the seal member body, simplification in structure enables a reduction in cost, and by maintaining a stable pressing force in the longitudinal direction, seal performance can be improved.

Advantageously, in the combustor seal structure, the first seal face and the second seal face are disposed on a side of a combustion gas passage.

Accordingly, since the compressed air has a pressure higher than that of the combustion gas, by providing each seal face on the side of the combustion gas passage, the projection portion is prevented from being separated from the seal face by the compressed air, and stable seal performance can be maintained. Also, by setting the urging force of the spring member to be small, a production cost can be reduced.

Advantageously, in the combustor seal structure, the first spring member and the second spring member are alternately provided in a longitudinal direction of the seal member body.

Accordingly, by alternately providing the first spring member and the second spring member in the longitudinal direction of the seal member body, a stable pressing force having no variations in the longitudinal direction is maintained, whereby self-excited vibration can be prevented from occurring, resulting in maintaining seal performance.

Advantageously, in the combustor seal structure, the first spring member is provided from the first projection portion via a first curved portion, and the second spring member is provided from the second projection portion via a second curved portion.

Accordingly, by providing the spring member from the projection portion via the curved portion, the seal member can be provided by performing bending, so that simplification in structure enables a reduction in cost.

Advantageously, in the combustor seal structure, the first projection portion, the first curved portion, and the first spring member are consecutively provided from the one end portion in the width direction of the seal member body in an integrated manner, and the second projection portion, the second curved portion, and the second spring member are consecutively provided from the other end portion in the width direction of the seal member body in an integrated manner.

Accordingly, by consecutively providing the projection portion, the first curved portion, and the first spring member in an integrated manner from the seal member body, it is not necessary to join the component members by welding or the like, so that production accuracy can be increased.

Advantageously, in the combustor seal structure, a first pressing portion for contact with the second pressing face is provided at the distal end portion of the first spring member and a second pressing portion for contact with the first pressing face is provided at the distal end portion of the second spring member, the first pressing portion and the second projection portion are disposed facing each other, and the second pressing portion and the first projection portion are disposed facing each other.

Accordingly, by providing the pressing portion and the projection portion so as to face each other, assembly can be improved.

Advantageously, in the combustor seal structure, the base end portion of the first spring member is joined to the first projection portion, and the base end portion of the second spring member is joined to the second projection portion.

Accordingly, by producing the projection portion and the spring member as different members, a yield of component members can be improved, whereby a material cost can be reduced.

According to another aspect of the present invention, a combustor seal includes: a seal member body having an elongated shape; a first projection portion and a second projection portion that are provided at each end portion in a width direction of the seal member body, and that are capable of being in contact with different seal faces; a first spring member having a base end portion connected to one end portion in the width direction of the seal member body and a distal end portion extending to the other end portion; and a second spring member having a base end portion connected to the other end portion in the width direction of the seal member body and a distal end portion extending to the one end portion.

Accordingly, in a configuration by providing the projection portion and the spring member on both sides of the seal member body, simplification in structure enables a reduction in cost, and by maintaining a stable pressing force in the longitudinal direction, seal performance can be improved.

Advantageous Effects of Invention

According to the combustor seal structure and combustor seal of the present invention, in a configuration by providing projection portions and spring members on both sides of a seal member body, the projection portions are pressed against first seal faces by urging forces of the spring members to perform sealing. Thus, simplification in structure enables a reduction in cost, and by maintaining a stable pressing force in the longitudinal direction, seal performance can be improved.

DESCRIPTION OF EMBODIMENTS

Preferred embodiments of a combustor seal structure and combustor seal according to the present invention are described in detail with reference to the accompanying drawings. Note that the present invention is not limited by the embodiment, and that, when there are plural embodiments, the present invention includes combinations of the embodiments.

First Embodiment

Figure 3:
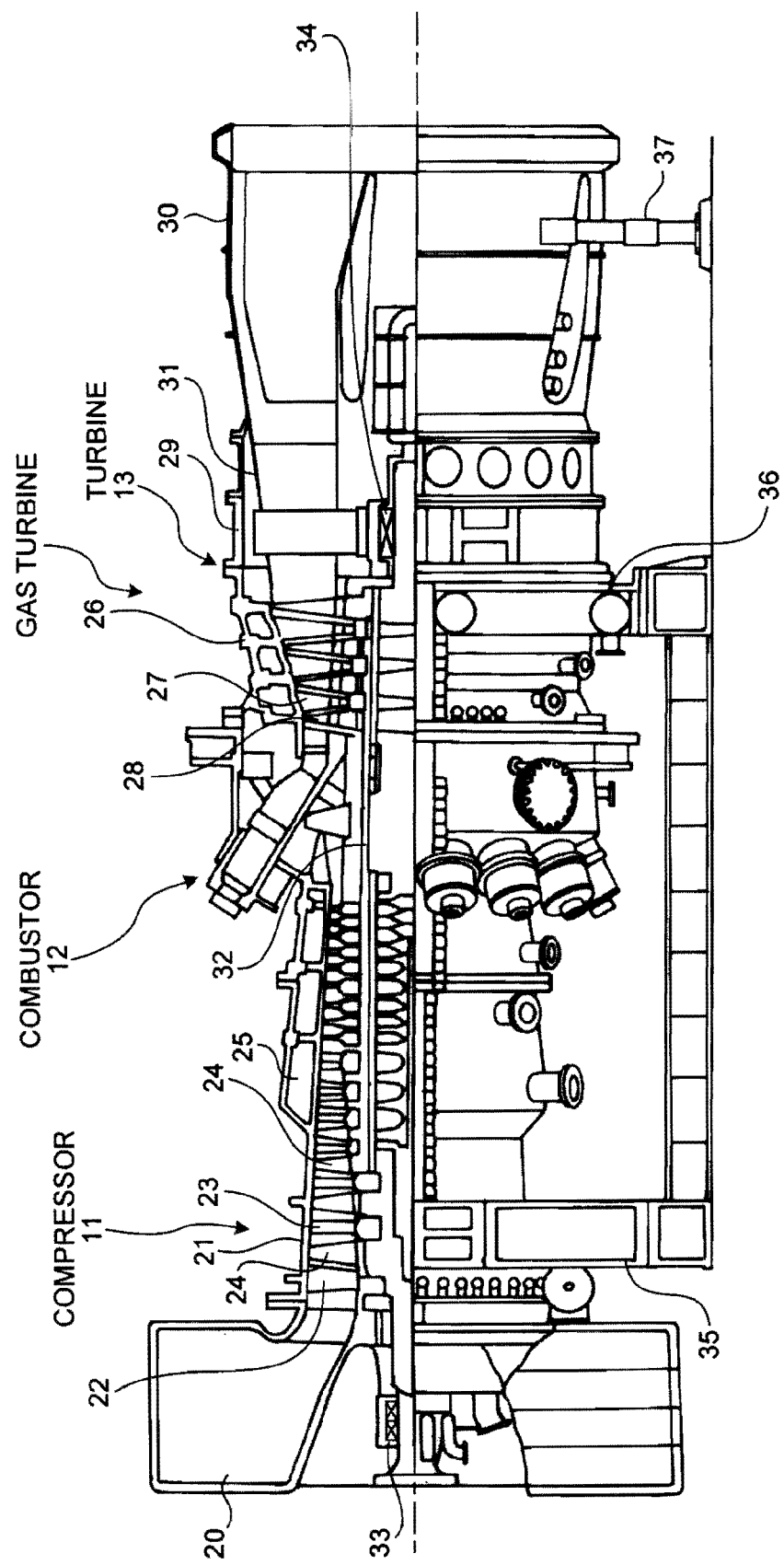
FIG. 3 is a schematic configuration diagram illustrating a gas turbine.
Figure 4:
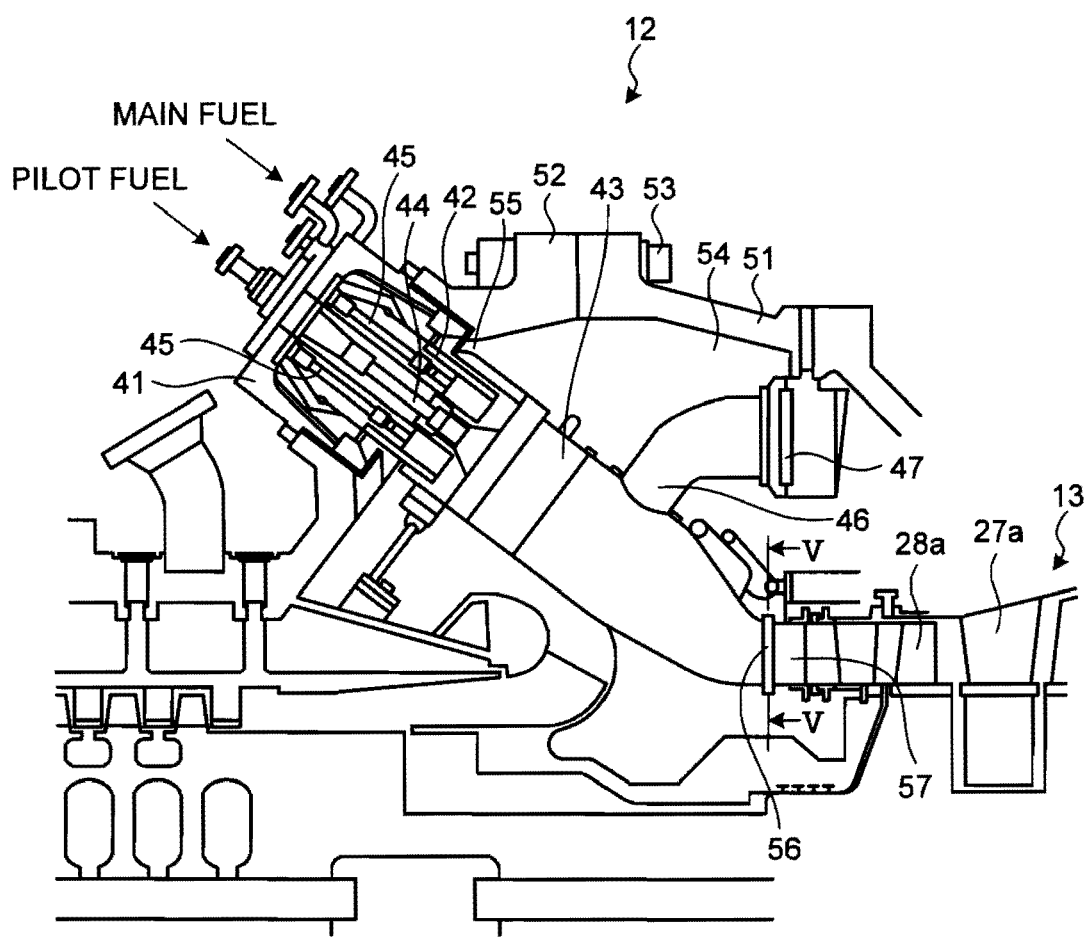
FIG. 4 is a schematic configuration diagram illustrating a combustor of the gas turbine.
Figure 5:
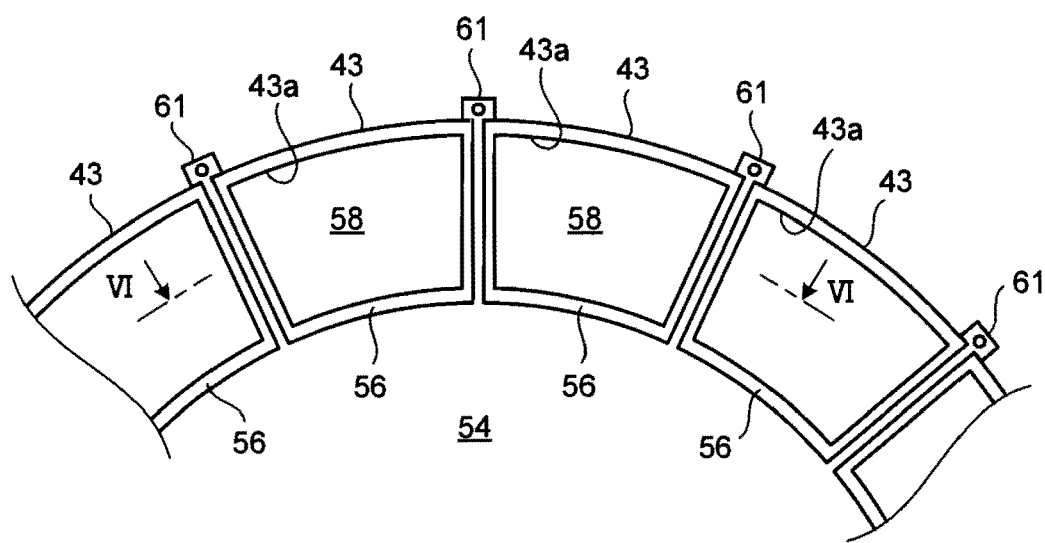
FIG. 5 is a diagram of the V-V section in FIG. 4, illustrating an outlet of a combustor.
Figure 6:
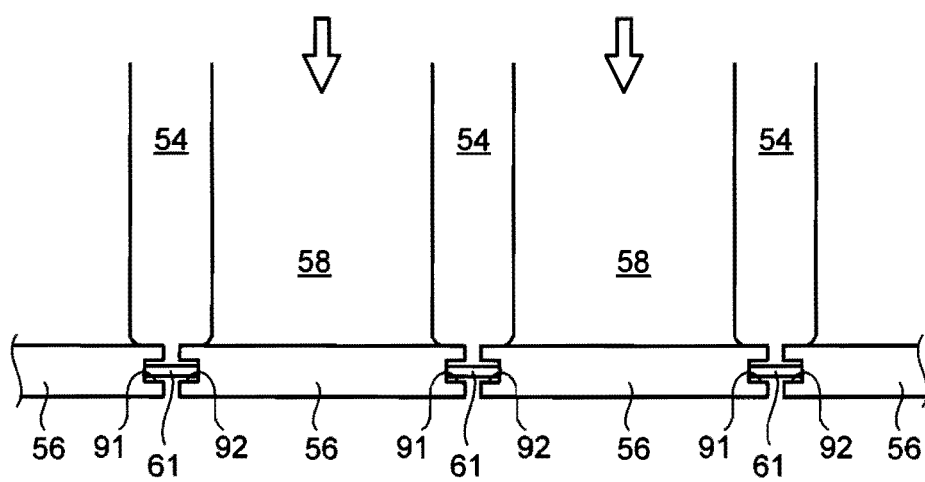
FIG. 6 is a diagram of the VI-VI section in FIG. 5.

FIG. 3 is a schematic configuration diagram illustrating a gas turbine; FIG. 4 is a schematic configuration diagram illustrating a combustor of the gas turbine; FIG. 5 is a diagram of the V-V section in FIG. 4, illustrating an outlet of the combustor; and FIG. 6 is a diagram of the VI-VI section in FIG. 5.

The gas turbine of the first embodiment includes a compressor 11, a combustor 12, and a turbine 13, as illustrated in FIG. 3. An electric generator, which is not illustrated, is connected to this gas turbine, and is able to generate electric power.

The compressor 11 has therein an air intake 20 for taking in air. In a compressor casing 21, an inlet guide vane (IGV) 22 is disposed, and plural compressor vanes 23 and turbine blades 24 are alternately disposed in a front-back direction (axial direction of a rotor 32, which is described below). An air extraction casing 25 is provided outside the compressor vanes 23 and the turbine blades 24. The combustor 12 is able to cause combustion by feeding fuel to compressed air that is compressed by the compressor 11, and igniting the compressed air. The turbine 13 has, in a turbine casing 26, plural turbine vanes 27 and turbine blades 28 that are alternately disposed in a front-back direction (axial direction of the rotor 32, which is described below). An exhaust casing 30 is disposed downstream the turbine casing 26 via an exhaust casing 29. The exhaust casing 30 includes an exhaust diffuser 31 continuous to the turbine 13.

In addition, the rotor (rotational shaft) 32 is positioned so as to penetrate the centers of the compressor 11, the combustor 12, the turbine 13, and the exhaust casing 30. An end portion on the side of the compressor 11 of the rotor 32 is supported by a bearing 33 so as to rotate, while another end portion of the exhaust casing 30 is supported by a bearing 34 so as to rotate. Further, in the rotor 32, plural disks provided with the respective turbine blades 24 are fixed in a stacked manner by the compressor 11, and plural disks provided with the respective turbine blades 28 are fixed in a stacked manner by the turbine 13. A driving shaft of the electric generator, which is not illustrated, is connected to an end portion on the side of the exhaust casing 30 of the rotor 32.

Furthermore, in this gas turbine, the compressor casing 21 of the compressor 11 is supported by a leg portion 35, the turbine casing 26 of the turbine 13 is supported by a leg portion 36, and the exhaust casing 30 is supported by a leg portion 37.

Therefore, air taken in from the air intake 20 of the compressor 11 passes through the inlet guide vane 22, and the plural compressor vanes 23 and turbine blades 24, whereby the air is compressed to become high temperature and pressure compressed air. In the combustor 12, predetermined fuel is fed to the compressed air to cause combustion. In addition, high temperature and pressure combustion gas, as working fluid, generated in the combustor 12 passes through the plural turbine vanes 27 and turbine blades 28 included in the turbine 13, whereby the rotor 32 is rotationally driven, and the electric generator connected to the rotor 32 is driven. Meanwhile, the energy of exhaust gas (combustion gas) is converted into pressure and is reduced in speed by the exhaust diffuser 31 of the exhaust casing 30 before it is emitted to atmosphere.

In the above-described combustor 12, as illustrated in FIG. 4, an external cylinder 41 has therein an inner cylinder 42 supported with a predetermined distance between the external cylinder 41 and the inner cylinder 42, and a transition piece 43 is connected to a distal end of the inner cylinder 42 to constitute a combustor casing. In the inner cylinder 42, a pilot combustion burner 44 is disposed so as to be positioned in the center of the interior, and plural main combustion burners 45 are circumferentially disposed on an inner circumferential surface of the inner cylinder 42 so as to surround the pilot combustion burner 44. In addition, a bypass tube 46 is connected to the transition piece 43, and this bypass tube 46 is provided with a bypass valve 47.

In detailed description, the external cylinder 41 is configured such that an external pipe cover portion 52 is secured by plural secure bolts 53 so as to be closely attached to a base end portion of an external pipe body 51. A compressed air supply space part 54 is defined between the external pipe body 51 and the transition piece 43. In the inner cylinder 42, the base end portion is fitted into the external pipe cover portion 52 and an air passage 55 connecting to the compressed air supply space part 54 is formed between the external pipe cover portion 52 and the inner cylinder 42.

In addition, a flange portion 56 at a combustion gas outlet end and a turbine inlet nozzle 57 are connected to the transition piece 43. This turbine inlet nozzle 57 is provided with a first stage turbine blade 28a and a first stage turbine vane 27a in the turbine 13.

Accordingly, when an air flow of high temperature and pressure compressed air flows from the compressed air supply space part 54 into the air passage 55, this compressed air flows into the inner cylinder 42. In this inner cylinder 42, this compressed air is mixed with fuel sprayed from the main combustion burner 45 to become a swirl flow of premixed gas, and the gas flows into the transition piece 43. Also, the compressed air is mixed with fuel sprayed from the pilot combustion burner 44, and the mixture is ignited by a pilot light, which is not illustrated, to cause combustion, so that the mixture becomes combustion gas and the gas is sprayed into the transition piece 43. At this time, by causing part of the combustion gas to be sprayed with flame into the transition piece 43 so as to be diffused around, the premixed combustion gas, which has flew from each main combustion burner 45 into the transition piece 43 is ignited to cause combustion. Then, the produced combustion gas passes from the transition piece 43 through the turbine inlet nozzle 57, and is sent into the first stage turbine blade 28a and the first stage turbine vane 27a of the turbine 13.

Meanwhile, since the plural combustors 13 are circumferentially disposed at predetermined intervals, as illustrated in FIGS. 5 and 6, also plural transition pieces 43 are circumferentially disposed at predetermined intervals. Outlet ends 43a of these transition pieces 43 are rectangular, and flange portions 56 are provided in the periphery of the transition pieces 43. In this case, peripheral portions of the respective transition pieces 43 are the compressed air supply space part 54, the interiors of outlet ends 43a of the transition pieces 43 are combustion gas passages 58, and the pressure of the compressed air is higher than that of the combustion gas. Thus, there is a risk that the compressed air of the compressed air supply space part 54 may leak from gaps between adjacent flange portions 56 of the transition pieces 43 into the combustion gas passages 58.

Accordingly, in this embodiment, seal members (combustor seals) 61 are provided between the flange portions 56 of the transition pieces 43. In other words, in the flange portions 56 of the transition pieces 43, first recess portions 91 and second recess portions 92 are formed along a flow direction of the combustion gas adjacent opposing faces. Each seal member 61 is disposed across the first recess portion 91 and the second recess portion 92 of two adjacent flange portions 56, whereby the seal member 61 can prevent the compressed air in the compressed air supply space part 54 from being leaked from each gap (the first recess portion 91 and the second recess portion 92) between two flange portions 56 into the combustion gas passages 58.

Figure 1:
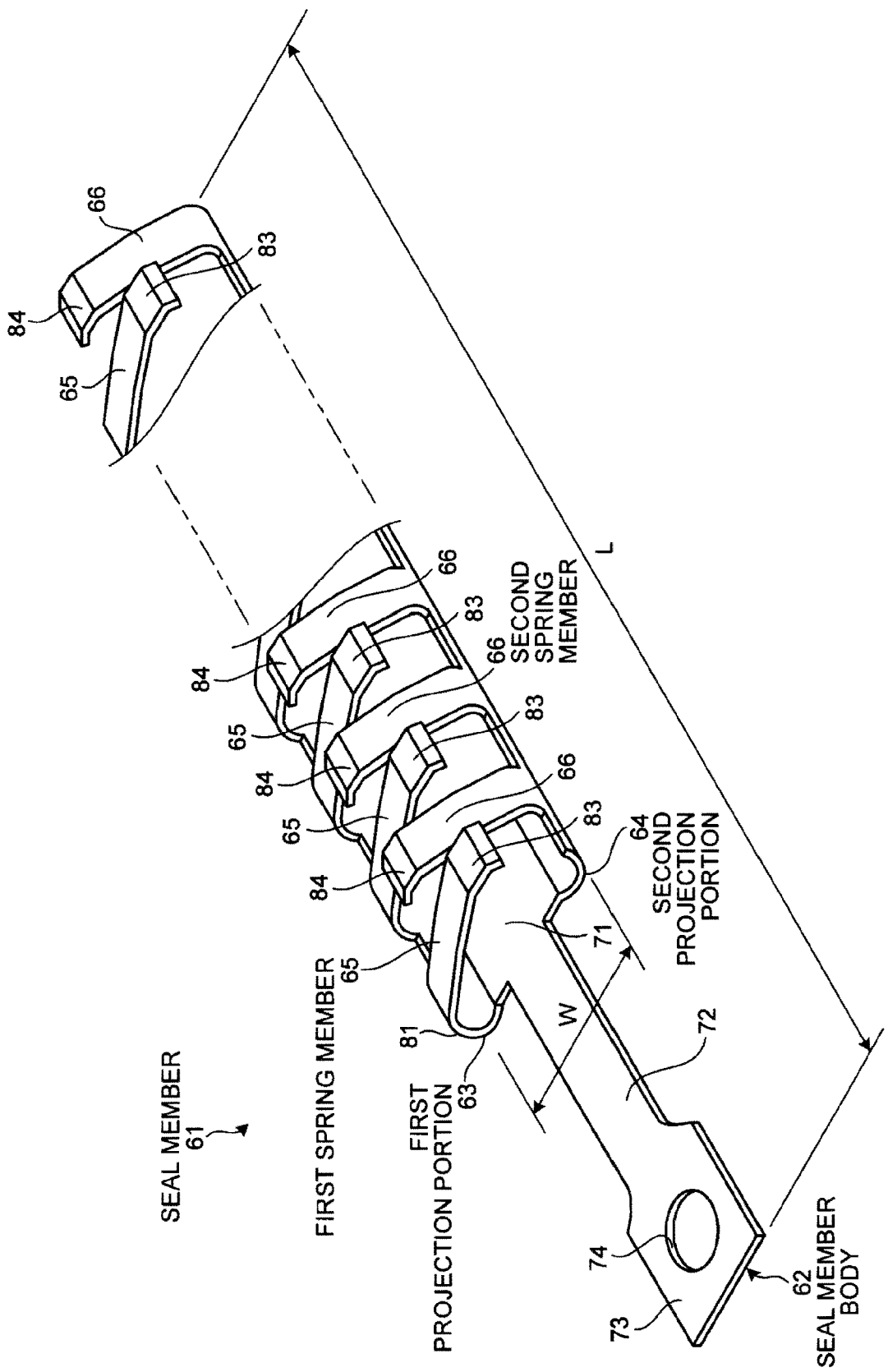
FIG. 1 is a schematic perspective view illustrating a seal member as a combustor seal according to a first embodiment of the present invention.
Figure 2:
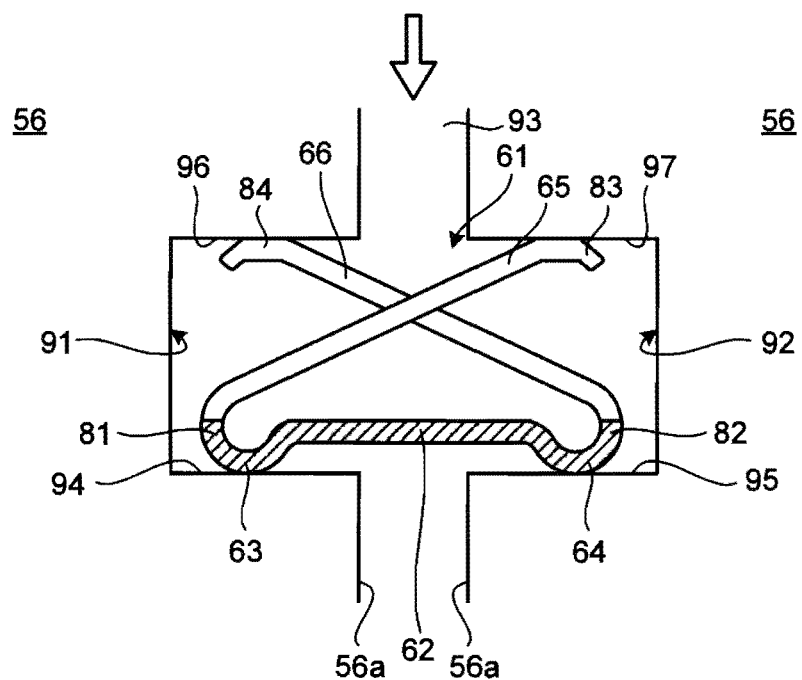
FIG. 2 is a schematic view illustrating a combustor seal structure of the first embodiment.

FIG. 1 is a schematic perspective diagram illustrating a seal member as a combustor seal according to the first embodiment of the present invention, and FIG. 2 is a schematic diagram illustrating the combustor of the first embodiment.

As illustrated in FIG. 1, the seal member 61 includes seal member bodies 62, first projection portions 63 and second projection portions 64, and first spring members 65 and second spring members 66. The first spring members 65 and the second spring members 66 are alternately provided in a longitudinal direction of the seal member 61.

The seal member body 62 includes a flat member 71 having a predetermined length L and a predetermined width W, which is elongated, and is such that an attachment part 73 is integrally formed by connecting a connecting part 72, which has a narrow width, to a base end portion via a connecting part 72, and this attachment part 73 has an attachment hole 74 formed therein.

This seal member body 62 has the first projection portion 63 and the second projection portion 64 formed at each end portion in a width direction. The first projection portion 63 has a downwardly curved projecting shape at one end portion in the width direction in the seal member body 62, and is formed to be continuous to the longitudinal direction of the seal member body 62 (flat member 71). The second projection portion 64 has a downwardly curved projecting shape at another end in the width direction of the seal member body 62, and is formed to be continuous to the longitudinal direction of the seal member body 62 (flat member 71).

In addition, in the seal member body 62, the first spring members 65 are continuously formed in an integrated manner from the first projection portions 63 via first curved portions 81 at one end portion in a width direction, and the second spring members 66 are continuously formed in an integrated manner from the second projection portions 64 via second curved portions 82 at the other end portion in the width direction. The first curved portions 81 and the second curved portions 82 are continuously formed in a longitudinal direction of the seal member body 62 (flat member 71).

In this case, the first curved portions 81 are formed from the first projection portions 63 at one end portion in the width direction of the seal member body 62 such that they have nearly identical curvature radi. Regarding the first spring members 65, their base end portions are connected to the first curved portions 81, and their distal end portions extend to the other end portion in the width direction of the seal member body 62. The second curved portions 82 are formed from the second projection portions 64 at the other end portion in the seal member body 63 such that they have nearly identical curvature radi. Regarding the second spring members 66, their end portions are connected to the second curved portions 82, and their distal end portions extend to the one end portion in the width direction of the seal member body 61.

In addition, the first spring members 65 extend having such a predetermined angle that their distal end portions become gradually separate with respect to the seal member body 62, and their distal end portions are provided with first pressing portions 83 that become nearly parallel to the seal member body 62. The second spring members 66 extend having such a predetermined angle that their distal end portions become gradually separate with respect to the seal member body 62, and their distal end portions are provided with second pressing portions 84 that become nearly parallel to the seal member body 62. In this case, the first spring members 65 and the second spring members 66 are disposed to cross each other, the first pressing portions 83 and the second projection portions 64 are disposed such that both vertically face each other, and the second pressing portions 84 and the first projection portions 63 are disposed such that both vertically face each other.

The combustor seal structure of the first embodiment seals the connecting part between the flange portion 56 of the transition piece 43 and the turbine inlet nozzle 57, and includes the first recess portion 91 and the second recess portion 92, and the above-described seal member 61.

As illustrated in FIG. 2, the adjacent flange portions 56 have a gap 93 provided therein that connects to the compressed air supply space part 54, and the first recess portion 91 and the second recess portion 92 are formed, which are respectively provided on facing faces 56a. Regarding the first recess portion 91 and the second recess portion 92, a first seal face 94 and a second seal face 95 are formed on the side (bottom side in FIG. 2) of the combustion gas passages 58, and the first pressing face 96 and the second pressing face 97 are formed on the side (top side in FIG. 2) of the compressed air supply space part 54.

The seal member 61 (seal member body 62) is disposed across the first recess portion 91 and the second recess portion 92. The first projection portion 63 is in contact with the first seal face 94 of the first recess portion 91, and the second projection portion 64 is in contact with the second seal face 95 of the second recess portion 92. In addition, in the first spring member 65, the first pressing portion 83 abuts on the second pressing face 97 of the second recess portion 92, whereby the first projection portion 63 is pressed against the first seal face 94 by an urging force of the first spring member 65, while in the second spring member 66, the second pressing portion 84 abuts on the first pressing face 96 of the first recess portion 91, whereby the second projection portion 64 is pressed against the second seal face 95 by an urging force of the second spring member 66.

The first projection portion 63 is pressed against the first seal face 94 and the second projection portion 64 is pressed against the second seal face 95, whereby contact portions between the first projection portion 63 and the first seal face 94 and between the second projection portion 64 and the second seal face 95 serve as seal faces. Accordingly, the compressed air that leaks from the compressed air supply space part 54 into the combustion gas passages 58 through the gap 93 can be stopped by the seal faces.

The combustor seal structure of the first embodiment includes the first recess portion 91 and the second recess portion 92 provided on the opposing faces of the adjacent flange portions 56 of the transition piece 43; the seal member body 62 provided across the first recess portion 91 and the second recess portion 92; the first projection portion 63 and the second projection portion 64, which are provided at each end portion in the width direction of the seal member body 62, and which are capable of being in contact with the first seal face 94 of the first recess portion 91 and the second seal face 95 of the second recess portion 92; the first spring member 65, whose end portion is connected to one end portion in the width direction of the seal member body 62 and whose distal end portion extends to the other end portion so as to be in contact with the second pressing face 97; and the second spring member 66, whose base end portion is connected to the other end portion in the width direction of the seal member body 62 and whose distal end portion extends to the one end portion so as to be in contact with the first pressing face 96.

Accordingly, the seal member body 62 is disposed across the first recess portion 91 and the second recess portion 92. The first projection portion 63 is pressed against the first seal face 94 of the first recess portion 91 by the urging force of the first spring member 65. The second projection portion 64 is pressed against the second seal face 95 by the urging force of the second spring member 66. Sealing is performed at a contact position between each of the projection portions 63 and 64 and each of the seal faces 94 and 95. Thus, mixing of the compressed air and the combustion gas can be prevented. Regarding the seal member 61, the projection portions 63 and 64, and the spring members 65 and 66 are provided on both sides of the seal member body 62. Thus, simplification in structure enables a reduction in cost, and by maintaining a stable pressing force in the longitudinal direction, seal performance can be improved.

In the combustor seal structure of the first embodiment, the first seal face 94 and the second seal face 95 are disposed on the side of the combustion gas passage 58. Therefore, since the compressed air has a pressure higher than that of the combustion gas, by disposing each of the seal faces 94 and 95 on the side of the combustion gas passage 58, the projection portions 63 and 64 are prevented from being separated such that they are pressed against the seal faces 94 and 95 by the compressed air, so that stable seal performance can be maintained, and by setting the urging forces of the spring members 65 and 66 to be small, a production cost can be reduced.

In the combustor seal structure of the first embodiment, the first spring members 65 and the second spring members 66 are alternately provided in the longitudinal direction of the seal member body 62. Thus, for the respective projection portions 63 and 64, stable pressing forces having no variations are maintained in the longitudinal direction, whereby self-excited vibration can be suppressed from occurring, resulting in maintaining seal performance.

In the combustor seal structure of the first embodiment, the first spring members 65 are provided from the first projection portions 63 via the first curved portions 81, and the second spring members 66 are provided from the second projection portions 64 via the second curved portions 82. Accordingly, by providing the spring members 65 and 66 from the projection portions 63 and 64 via the curved portions 81 and 82, the seal member 61 can be produced by performing bending, and simplification in structure enables a reduction in cost.

In the combustor seal structure of the first embodiment, the first projection portions 63, the first curved portions 81, and the first spring members 65 are consecutively provided in an integrated manner from one end portion in the width direction of the seal member body 62, and the second projection portions 64, the second curved portions 82, and the second spring members 66 are consecutively provided in an integrated manner from the other end portion in the width direction of the seal member body 62. Accordingly, it is not necessary to join component members, such as the seal member body 62, the projection portions 63 and 64, the curved portions 81 and 82, and the spring members 65 and 66, by welding or the like, so that production accuracy can be increased.

In the combustor seal structure of the first embodiment, the first pressing portion 83, which is in contact with the second pressing face 97, is provided at a distal end portion of the first spring member 65; the second pressing portion 84, which is in contact with the first pressing face 96, is provided at a distal end portion of the second spring member 66; the first pressing portion 83 and the second projection portion 64 are disposed facing each other; and the second pressing portion 84 and the first projection portion 63 are disposed facing each other. Therefore, by disposing the pressing portions 83 and 84, and the projection portions 63 and 64 so as to face each other, the first pressing portion 83 and the second projection portion 64 are caused to be close to each other, and the second pressing portion 84 and the first projection portion 63 are caused to be close to each other, whereby the seal member 61 can easily be pressed to be inserted into the recess portions 91 and 92, so that assembly can be improved.

In addition, the seal member (combustor seal) 61 of the first embodiment includes the seal member body 62 that has an elongated shape, the first projection portions 63 and the second projection portions 64 that are provided at the respective end portions in the width direction of the seal member body 62 and that are in contact with the seal faces 94 and 95, which are different; the first spring members 65 whose base end portions are connected to one end portion in the width direction of the seal member body 62 and whose distal end portions extend to the other end portion; and the second spring members 66 whose base end portions are connected to the other end portion in the width direction of the seal member body 62 and whose distal end portions extend to one end portion.

Therefore, in a configuration by providing the projection portions 63 and 64, and the spring members 65 and 66 on both sides of the seal member body 62, simplification in structure enables a reduction in cost, and by maintaining a stable pressing force in the longitudinal direction, seal performance can be improved.

Second Embodiment

Figure 7:
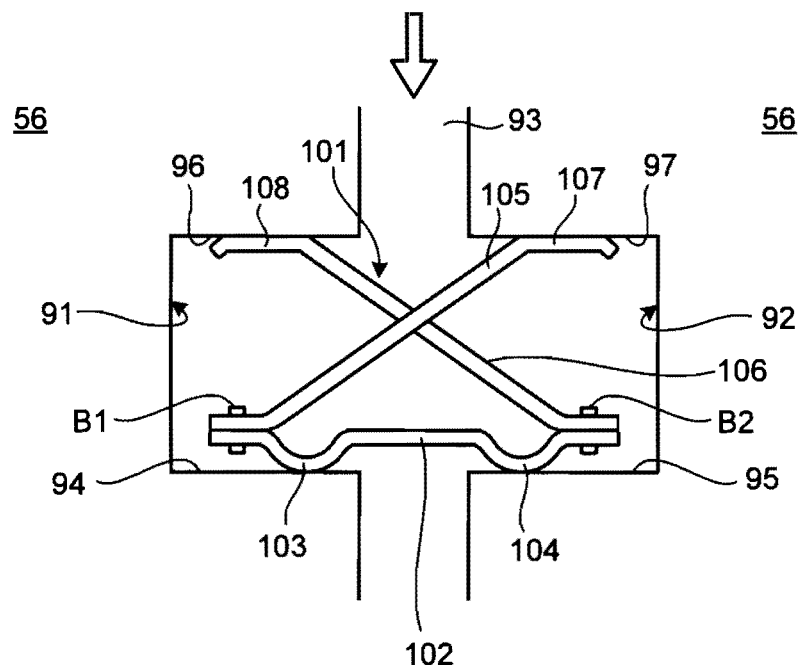
FIG. 7 is a schematic diagram illustrating a combustor seal structure according to a second embodiment of the present invention.

FIG. 7 is a schematic diagram illustrating a combustor seal structure according to the second embodiment of the present invention. Note that members having functions similar to those of the above-described embodiment are denoted by identical reference signs detailed descriptions thereof will not be repeated here.

In the second embodiment, as illustrated in FIG. 7, a seal member 101 includes a seal member body 102, first projection portions 103 and second projection portions 104, and first spring members 105 and second spring members 106. The first spring members 105 and the second spring members 106 are alternately provided in the longitudinal direction of the seal member body 101.

The seal member body 102 has an elongated shape having a predetermined length and a predetermined width. In the seal member body 102, each first projection portion 103 and each second projection portion 104 are formed at end portions in the width direction, and are consecutively formed in the longitudinal direction of the seal member body 102.

In addition, in the seal member body 102, at one end portion of the width direction, the first spring member 105 is joined outside the first projection portion 103, and at the other end portion of the width direction, the second spring member 106 is joined outside the second projection portion 104.

In this case, in the first spring member 105, its base end portion is connected to one end portion of the seal member body 102 by welding B1, and its distal end portion extends to the other end portion in the width direction of the seal member body 102. In the second spring member 106, its base end portion is connected to the other end portion of the seal member body 102 by welding B2, and its distal end portion extends to one end portion in the width direction of the seal member body 102.

In addition, the first spring member 105 extends having such an angle that its distal end portion becomes gradually separate with respect to the seal member body 102, and its distal end portion is provided with a first pressing portion 107 that becomes nearly parallel to the seal member body 102. The second spring member 106 extends having such an angle that its distal end portion becomes gradually separate with respect to the seal member body 102, and its distal end portion is provided with a second pressing portion 108 that becomes nearly parallel to the seal member body 102.

The seal member 101 of the second embodiment is disposed across the first recess portion 91 and second recess portion 92 formed in adjacent flange portions 56. The first projection portion 103 is in contact with the first seal face 94 of the first recess portion 91, and the second projection portion 104 is in contact with the second seal face 95 of the second recess portion 92. In addition, in the first spring member 105, the first pressing portion 107 abuts on the second pressing face 97 of the second recess portion 92, whereby the first projection portion 103 is pressed against the first seal face 94 by the urging force of the first spring member 105. Also, in the second spring member 106, the second pressing portion 108 abuts on the first pressing face 96 of the first recess portion 91, whereby the second projection portion 104 is pressed against the second seal face 95 by the urging force of the second spring member 106.

The first projection portion 103 is pressed against the first seal face 94, and the second projection portion 104 is pressed against the second seal face 95, whereby contact portions between the first projection portion 103 and the first seal face 94, and between the second projection portion 104 and the second seal face 95 serve as seal faces. Accordingly, compressed air that leaks from the compressed air supply space part 54 into the combustion gas passages 58 through the gap 93 can be stopped by the seal faces.

As described above, in the seal member (combustor seal) 101 and combustor seal structure of the second embodiment, the first projection portion 103 and the second projection portion 104, which are capable of being in contact with the seal faces 94 and 95, which are different, are provided at two end portions in the width direction of the seal member body 102; the first spring member 105, whose base end portion is connected to one end portion in the width direction of the seal member body 102, and whose distal end portion extends to the other end portion, and the second spring member 106, whose base end portion is connected to the other end portion in the width direction of the seal member body 102, and whose distal end extends to the one end portion, are provided; and the spring members 105 and 106 are joined to the projection portions 103 and 104 by welding.

Therefore, in a configuration by providing the projection portions 103 and 104, and the spring members 105 and 106 on both sides of the seal member body 102, simplification in structure enables a reduction in cost, and by maintaining a stable pressing force in the longitudinal direction, seal performance can be improved. In addition, by producing the projection portions 103 and 104, and the spring members 105 and 106, as different members, a yield of component members is improved to enable a reduction in material cost.

Third Embodiment

Figure 8:
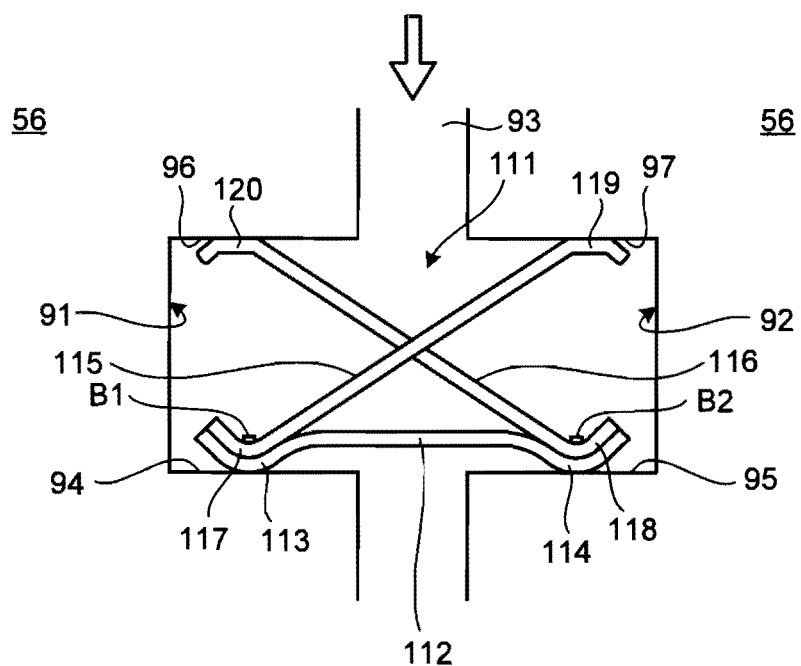
FIG. 8 is a schematic diagram illustrating a combustor seal structure according to a third embodiment of the present invention.

FIG. 8 is a schematic diagram illustrating a combustor seal structure according to the third embodiment of the present invention. Note that members having functions similar to those of the above-described embodiments are denoted by identical reference signs detailed descriptions thereof will not be repeated here.

In the third embodiment, as illustrated in FIG. 8, a seal member 111 includes a seal member body 112; first projection portions 113 and second projection portions 114; and a first spring member 115 and a second spring member 116. The first spring member 115 and the second spring member 116 are alternately provided in the longitudinal direction of the seal member body 112.

The seal member body 112 has an elongated shape having a predetermined length and a predetermined width. In the seal member body 112, each first projection portion 113 and each second projection portion 114 are formed at end portions in the width direction, and are consecutively formed in the longitudinal direction of the seal member body 112.

In addition, in the seal member body 112, the first spring member 115 is joined to the first projection portion 113 at one end portion in the width direction, and the second spring member 116 is joined to the second projection portion 114 at the other end portion.

In this case, in the first spring member 115, a curved portion 117 of a base end portion is overlaid on and connected to the first projection portion 113 by welding B1, and a distal end portion extends to the other end portion in the width direction of the seal member body 112. In the second spring member 116, a curved portion 118 of the base end portion is overlaid on and connected to the second projection portion 114 by welding B2, and a distal end portion extends to one end portion in the width direction of the seal member body 112.

In addition, the first spring member 115 extends having such a predetermined angle that its distal end portion becomes gradually separate with respect to the seal member body 112, and the distal end portion is provided with a first pressing portion 119 that becomes nearly parallel to the seal member body 112. The second spring member 116 extends having such a predetermined angle that its distal end portion becomes gradually separate with respect to the seal member body 112, and the distal end portion is provided with a second pressing portion 120 that becomes nearly parallel to the seal member body 112.

The seal member 111 of the third embodiment is disposed across the first recess portion 91 and second recess portion 92 formed in adjacent flange portions 56. The first projection portion 113 is in contact with the first seal face 94 of the first recess portion 91, and the second projection portion 114 is in contact with the second seal face 95 of the second recess portion 92. In addition, in the first spring member 115, the first pressing portion 119 abuts on the second pressing face 97 of the second recess portion 92, whereby the first projection portion 113 is pressed against the first seal face 94 by the urging force of the first spring member 115. Also, in the second spring member 116, the second pressing portion 120 abuts on the first pressing face 96 of the first recess portion 91, whereby the second projection portion 114 is pressed against the second seal face 95 by the urging force of the second spring member 116.

The first projection portion 113 is pressed against the first seal face 94, and the second projection portion 114 is pressed against the second seal face 95, whereby contact faces between the first projection portion 113 and the first seal face 94, and between the second projection portion 114 and the second seal face 95 serve as seal faces. Accordingly, compressed air that leaks from the compressed air supply space part 54 into the combustion gas passages 58 through the gap 93 can be stopped by the seal faces.

In the seal member (combustor seal) 111 and combustor seal structure of the third embodiment, the first projection portion 113 and the second projection portion 114, which are capable of being in contact with the seal faces 94 and 95, which are different, are provided on end portions of the width direction of the seal member body 112; the first spring member 115, whose base end portion is connected to one end portion in the width direction of the seal member body 112, and whose distal end portion extends to the other end portion; the second spring member 116 whose base end portion is connected to the other end portion in the width direction of the seal member body 112, and whose distal end portion extends to the one end portion; are provided. The spring members 115 and 116 are joined to the projection portions 113 and 114 by welding.

Therefore, in a configuration by providing the projection portions 113 and 114, and the spring members 115 and 116 on both sides of the seal member body 112, simplification in structure enable a reduction in cost, and by maintaining a stable pressing force in the longitudinal direction, seal performance can be improved. In addition, by producing the projection portions 113 and 114, and the spring members 115 and 116, as different members, a yield of component members is improved to enable a reduction in material cost.

Note that, in the above-described embodiment, in the seal members 61, 101, and 111, the first spring members 65, 105, and 115, and the second spring members 66, 106, and 116 are alternately provided one by one in the longitudinal direction of the seal member bodies 62, 102 and 112, but may alternately be provided in every plurality.

REFERENCE SIGNS LIST

11 compressor
12 combustor
13 turbine
41 external cylinder
42 inner cylinder
43 transition piece
54 compressed air supply space part
55 air passage
57 turbine inlet nozzle
58 combustion gas passage
61, 101, 111 seal member (combustor seal)
62, 102, 112 seal member body
63, 103, 113 first projection portion
64, 104, 114 second projection portion
65, 105, 115 first spring member
66, 106, 116 second spring member
81 first curved portion
82 second curved portion
83, 107, 119 first pressing portion
84, 108, 120 second pressing portion
91 first recess portion
92 second recess portion
93 gap
94 first seal face
95 second seal face
96 first pressing face
97 second pressing face

The invention claimed is:

1. A combustor seal structure for sealing connection portions between transition piece outlet ends and turbine inlet nozzles of a plurality of combustors disposed in a circumferential direction, the combustor seal structure comprising:
a first recess portion and a second recess portion that are respectively provided on facing faces of adjacent flange portions at the transition piece outlet ends; and
a seal member, wherein the seal member includes:
a seal member body disposed across the first recess portion and the second recess portion;
a first projection portion and a second projection portion, respectively formed on the seal member body at different end portions in a width direction of the seal member body, and capable of being in contact with a first seal face of the first recess portion and a second seal face of the second recess portion, respectively;
a plurality of first spring members extending from the first projection portion obliquely toward a side of the second projection portion in the width direction of the seal member body, and capable of being in contact with a second pressing face of the second recess portion which faces the second seal face; and
a plurality of second spring members extending from the second projection portion obliquely toward a side of the first projection portion in the width direction of the seal member body, and capable of being in contact with a first pressing face of the first recess portion which faces the first seal face, and wherein the plurality of first spring members and the plurality of second spring members are configured to cross one another if viewed from a longitudinal direction of the seal member body,
wherein the plurality of first spring members extend directly from the first projection portion to a free end such that the plurality of first spring members only connect to the seal member body at the first projection portion and are not in contact with the first recess portion, and the plurality of second spring members extend directly from the second projection portion to a free end such that the plurality of second spring members only connect to the seal member body at the second projection portion, and are not in contact with the second recess portion, and
wherein the plurality of first spring members and the plurality of second spring members are alternately provided in a longitudinal direction of the seal member body such that none of the plurality of first spring members and the plurality of second spring members are disposed at a same longitudinal position.

2. The combustor seal structure according to claim 1, wherein the first seal face and the second seal face are disposed on a side of a combustion gas passage.

3. The combustor seal structure according to claim 1, wherein
the plurality of first spring members is provided from the first projection portion via a first curved portion, and
the plurality of second spring members is provided from the second projection portion via a second curved portion.

4. The combustor seal structure according to claim 3, wherein
the first projection portion, the first curved portion, and the plurality of first spring members are consecutively provided from one end portion in the width direction of the seal member body in an integrated manner, and
the second projection portion, the second curved portion, and the plurality of second spring members are consecutively provided from another end portion in the width direction of the seal member body in an integrated manner.

5. The combustor seal structure according to claim 1, wherein
a first pressing portion for contact with the second pressing face is provided at the free end of the plurality of first spring members and a second pressing portion for contact with the first pressing face is provided at the free end of the plurality of second spring members,
the first pressing portion and the second projection portion are disposed facing each other, and
the second pressing portion and the first projection portion are disposed facing each other.

6. A combustor seal comprising:
a seal member body having an elongated shape;
a first projection portion and a second projection portion that are formed on the seal member body respectively at different end portions in a width direction of the seal member body, and that are capable of respectively being in contact with different seal faces;
a plurality of first spring members extending from the first projection portion obliquely toward a side of the second projection portion in the width direction of the seal member body;

a plurality of second spring members extending from the second projection portion obliquely toward a side of the first projection portion in the width direction of the seal member body, wherein the plurality of first spring members and the plurality of second spring members are configured to cross one another if viewed from a longitudinal direction of the seal member body wherein the plurality of first spring members extend directly from the first projection portion to a free end such that the plurality of first spring members only connect to the seal member body at the first projection portion and are not in contact with a first recess portion, and the plurality of second spring members extend directly from the second projection portion to a free end such that the plurality of second spring members only connect to the seal member body at the second projection portion, and are not in contact with the second recess portion, and wherein the plurality of first spring members and the plurality of second spring members are alternately provided in a longitudinal direction of the seal member body such that none of the plurality of first spring members and the plurality of second spring members are disposed at a same longitudinal position.

* * * * *